United States Patent
Cloutier (10) Patent No.: US 9,469,232 B2
(45) Date of Patent: Oct. 18, 2016

(54) ATTACHMENT BRACKET FOR USE WITH HEAVY MACHINERY AND BRACKET MEMBERS

(71) Applicant: Alain Cloutier, Montréal (CA)

(72) Inventor: Alain Cloutier, Montréal (CA)

( * ) Notice: Subject to any disclaimer, the term of this patent is extended or adjusted under 35 U.S.C. 154(b) by 96 days.

(21) Appl. No.: 14/386,406

(22) PCT Filed: Mar. 19, 2013

(86) PCT No.: PCT/CA2013/000263
§ 371 (c)(1),
(2) Date: Sep. 19, 2014

(87) PCT Pub. No.: WO2013/138907
PCT Pub. Date: Sep. 26, 2013

(65) Prior Publication Data
US 2015/0042113 A1    Feb. 12, 2015

(30) Foreign Application Priority Data
Mar. 19, 2012    (GB) .................................. 1204803.9

(51) Int. Cl.
*B60P 1/28* (2006.01)
*E02F 3/36* (2006.01)
(Continued)

(52) U.S. Cl.
CPC ................. *B60P 1/28* (2013.01); *B60D 1/143* (2013.01); *E02F 3/3618* (2013.01); *E02F 3/3686* (2013.01); *E02F 3/962* (2013.01); *B60D 2001/001* (2013.01)

(58) Field of Classification Search
CPC ..... E02F 3/962; E02F 3/3622; E02F 3/3686; E02F 3/3618; B60P 1/28; B60D 1/143; B60D 2001/001
USPC ....... 414/422, 424, 425, 722, 724, 740, 912; 37/468, 403
See application file for complete search history.

(56) References Cited

U.S. PATENT DOCUMENTS

| 1,334,002 | A | * | 3/1920 | Sussis | ................... | B65F 1/1468 |
| | | | | | | 414/538 |
| 2,345,790 | A | * | 4/1944 | Brooks | ................... | B60P 1/483 |
| | | | | | | 414/424 |

(Continued)

FOREIGN PATENT DOCUMENTS

| CA | 2411759 A | 5/2003 |
| DE | 4341313 A | 5/1995 |

(Continued)

OTHER PUBLICATIONS

International Search Report for PCT/CA2013/000263.

*Primary Examiner* — Jamie L McGowan
(74) *Attorney, Agent, or Firm* — Benoit & Cote Inc.

(57) ABSTRACT

An attachment bracket for use with heavy machinery and adapted to releasably attach to a double wheeled bin. The attachment bracket has a plurality of spaced parallel elongated bracket frame members, an elongated wide plate member connected to each the bracket frame member forming a rigid connection therebetween, a pair of spaced main hook members removably and adjustably connected to the wide plate member in between the bracket frame members, and a pair of secondary hook members, each rotationally connected to a respective the main hook member and biased such that they will return to an initial position when not being forced to rotate.

20 Claims, 11 Drawing Sheets

(51) Int. Cl.
*E02F 3/96* (2006.01)
*B60D 1/14* (2006.01)
*B60D 1/00* (2006.01)

(56) References Cited

U.S. PATENT DOCUMENTS

| | | | | |
|---|---|---|---|---|
| 2,502,681 | A | * | 4/1950 | Swanson ................ E02F 3/961 172/817 |
| 3,658,199 | A | * | 4/1972 | Owen, Jr. ............... B65F 3/041 414/406 |
| 4,627,780 | A | * | 12/1986 | Munz ...................... B60P 1/16 298/12 |
| 5,618,155 | A | * | 4/1997 | Tighe ..................... B60D 1/36 280/504 |
| 5,921,743 | A | * | 7/1999 | Slagter ................ E02F 3/3417 298/22 R |
| 6,088,939 | A | * | 7/2000 | Logan .................... E02F 3/404 37/404 |
| 7,984,575 | B2 | * | 7/2011 | Robl ..................... E02F 3/3622 172/273 |
| 8,870,295 | B1 | * | 10/2014 | Pope ........................ B60P 1/28 298/1 C |
| 2002/0110442 | A1 | | 8/2002 | Hurlburt |
| 2003/0095858 | A1 | * | 5/2003 | Mantovani ............ E02F 3/3618 414/723 |
| 2009/0180852 | A1 | * | 7/2009 | Schlofman .............. E02F 3/348 414/425 |
| 2011/0091267 | A1 | * | 4/2011 | Hill ...................... E02F 3/3618 403/31 |

FOREIGN PATENT DOCUMENTS

FR 876109 A 10/1942
WO WO 8503264 A 8/1985

* cited by examiner

ATTACHMENT BRACKET FOR USE WITH HEAVY MACHINERY AND BRACKET MEMBERS

FIELD OF THE INVENTION

The present invention relates generally to construction equipment but more particularly to an attachment bracket for use with heavy machinery and bracket members.

BACKGROUND OF THE INVENTION

Quite often on a construction site a bin is used for loading and carrying material from place to place around the site. Sometimes the bin used for temporarily storing aggregate material such as dirt or gravel for later use. The problem with those bins is that they are not easy to move around. Sometimes they are dragged on the ground, which is not the best way to move things around. There has to be a better and more efficient way of doing this.

SUMMARY OF THE INVENTION

In view of the foregoing disadvantages inherent in the known devices now present in the prior art, the present invention, which will be described subsequently in greater detail, is to provide objects and advantages which are:

To provide for an attachment that works with a variety of bins and other such container types that are used for storage and which is easily detachable from a tractor so that it can be set aside for a wile and then be readily reattached for being transported.

In order to do so, the invention consists in an attachment bracket for use with heavy machinery and adapted to releasably attach to a double wheeled bin. The attachment bracket has a plurality of spaced parallel elongated bracket frame members, an elongated wide plate member connected to each the bracket frame member forming a rigid connection therebetween, a pair of spaced main hook members removably and adjustably connected to the wide plate member in between the bracket frame members, and a pair of secondary hook members, each rotationally connected to a respective the main hook member and biased such that they will return to an initial position when not being forced to rotate.

A pair of arms extending in a perpendicular direction from base portions of two of the bracket frame members, and in a direction opposite from the direction the main and secondary hooks extend, each arm having an attachment notch on a distal end thereof. A pair of spaced parallel elongated movable members. At least one connector member extending between and connecting the movable members, and having a length that is greater than the elongated length of the wide plate member, an attachment connector member attached between top portions of the movable member, has a length that is greater than the length of the at least one connector member and is adapted to removably and securely attach to the double wheeled bin.

Two attachment pins respectively located on distal end portions of the movable members and are adapted to respectively rotationally and removably engage with the pair of arms, and two limiting rods respectively located on middle sections of the movable members and are adapted to respectively engage middle portions of the pair of arms thereby limiting rotational movement of the movable members with respect to the pair of arms, such that when the main and secondary hook members are engaged and lifted by heavy machinery the attachment bracket is secured thereon and capable of lifting the double wheeled bin into the air and transporting it to another location.

The attachment bracket is further comprised of a pair of skid members respectively and rotational attached on the distal end portions of the movable members.

The attachment bracket has the secondary hook members biased with respect to the main hook members by coil spring members.

The attachment bracket is further comprised of a pair of piston members connected between respective pairs of the main and secondary hook members, and are adapted to function as shock absorbers in conjunction with the coil spring members.

The attachment bracket is further comprised of a plow plate member securely attached to the bracket frame members on portions thereof adjacent and below the main and secondary hook members; and wherein the plow plate member includes plow hooks adapted to connect with a plow member attach to the heavy machinery.

The attachment bracket has the main and secondary hook members slidably movable and adjustably secured to the wide plate member to thereby be adapted to accommodate and attach to variously sized mechanical members of the heavy machinery.

The attachment bracket is further comprised of ratchet members respectively connected between each main and secondary hook member, to thereby hold the secondary hook members in respective desired position during operation.

The attachment bracket works in combination with a bin and a piece of heavy machinery.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 2-5*a-b* Isometric views showing the operating steps.

DETAILED DESCRIPTION OF THE PREFERRED EMBODIMENT

An attachment bracket (10) for use on heavy machinery such as excavators (48), for example, and to which is releasably attached a double wheeled bin (38) having a pair of wheels (34), and a frame (42).

The attachment bracket (10) consists in bracket frame members (16), a pair of main hooks (18) with each main hook (18) rotationally attached to a secondary hook (19). The secondary hooks (19) are biased into a rest configuration by way of biasing means (60).

The attachment bracket (10) has a pair of arms (90) located at the base of the frame members (16) which are rotationally attached to attachment pins (17) which extend from skids (92). Limiting rods (19) limit the rotation of movable members (94) by resting on top of the arms (90). The movable members (94) form part of the frame (42) and are rotatable in relation to the skids (92) but fixed in relation to the bin (38).

Pistons (96) are used as are used shock absorbers with coil springs in suspension systems and are preferable but not essential.

A plow plate (100) has plow hooks (102) to connect with a plow (106) from the excavator (48).

The plow (106) is used for moving the bin (38) around a construction site as well as aligning the wheels (34).

The main hooks (18), as well as the secondary hooks (19) can be adjusted width wise by sliding them along a wide plate (120) so that a variety of bucket (50) sizes can be used.

The movable members (94) are held parallel to each other by way of connector members (130).

A cover plate (113) protects a ratcheting means (140) as well as parts of the hooks (18, 19).

As best seen in FIGS. 2-5, the way the system works is that a bucket (50) from the excavator (48) hooks onto the main hooks (18) while at the same time engaging and moving the secondary hooks (19) backwards, as the bin (38) is lifted, so as to raise small hooks (21) which form part of the secondary hooks. These small hooks (21) hook onto a horizontal bar (131). The movement of the secondary hooks (19) is limited by a channel (62) and as the frame (42) moves in relation to the main hooks (18) at least one cable (64) is pulled, which moves a pair of blockers (66) into wheel locking notches (68). A set of pulleys (65) channels the cable (64) so that it can pull the two blockers (66) simultaneously.

The wheels (34) are connected to rotatable wheel forks (70) and need to be properly aligned and parallel in order to be blocked by the notches (68). The positioning of the wheels (34) is done by the excavator moving the bin (38), and the locking is done by pulling the bin (38) up as stated hereinabove. The alignment of the wheels (34) is critical in order to lift the bin (38) straight up. Because there are several locking notches (68), this gives some leeway so that the wheels (34) do not have to be perfectly aligned and parallel, which is often the case in actual practice.

Lifting the bin (38) makes the weight push against the wheels (34) and the forks (70), which could cause undue stress. So, a pair of support wheels (74) take the load until the weight is transferred onto a rim (76) at the front of the bin (38).

Reversing the operation unlocks the wheels (34) by having blocker biasing means (78) pull the blockers (66) out of the notches (68). Also, the small hooks (21) which are kept in a raised position by a ratcheting means (140) engaging a set of teeth (142), are released as contact from the horizontal bar (131) moves the ratcheting means (140) out of the teeth (142) so that the secondary hooks (19) can rotate and bring the small hooks (21) back down to hook the horizontal bar (131).

The bin (38) can consist of only its frame (42) onto which can be releasably attached a custom made container bin. Also, special hooking points (80) can be made into the frame (42) so that it can be lifted by way of hoisting cables (83) as seen in FIG. 8 for example.

Figure 1:
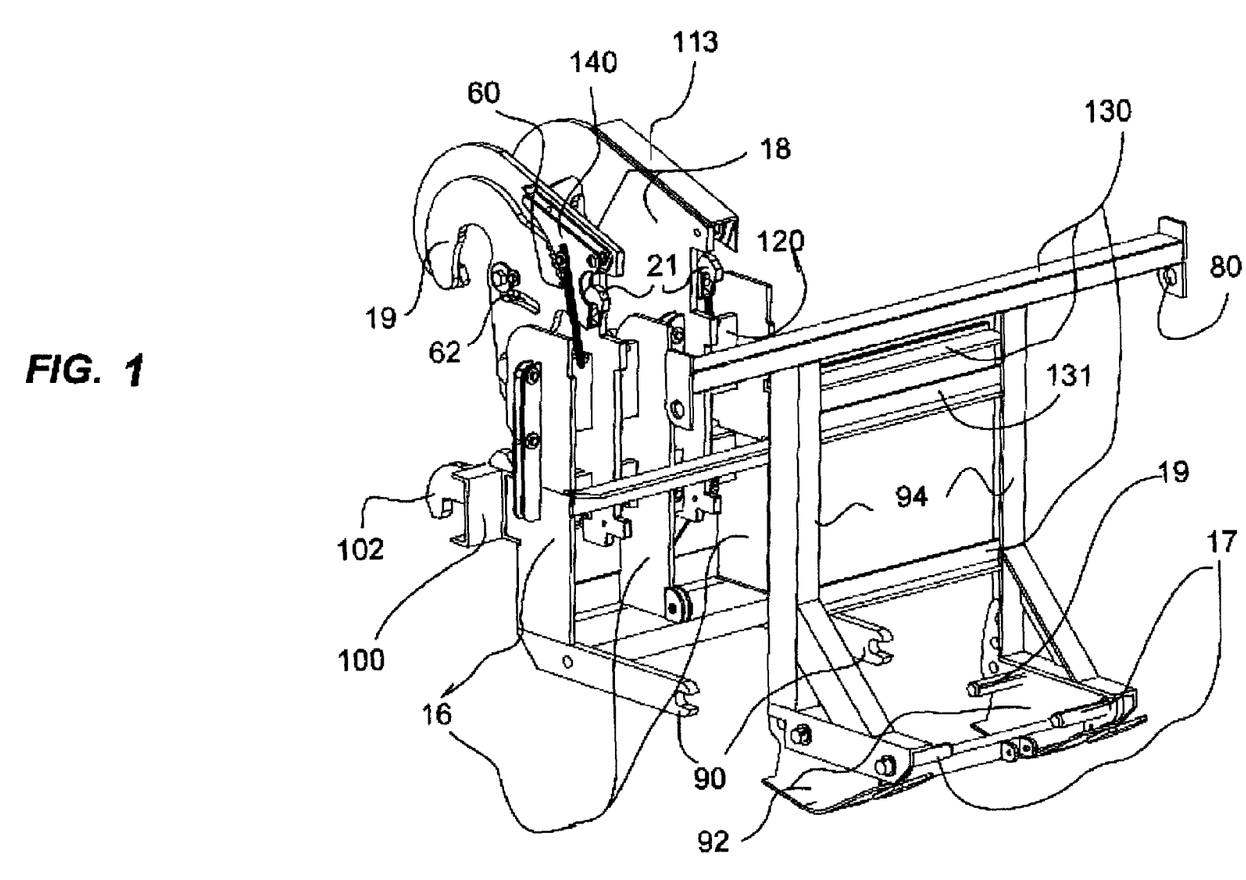
FIG. 1 Isometric view of the invention.
Figure 2:
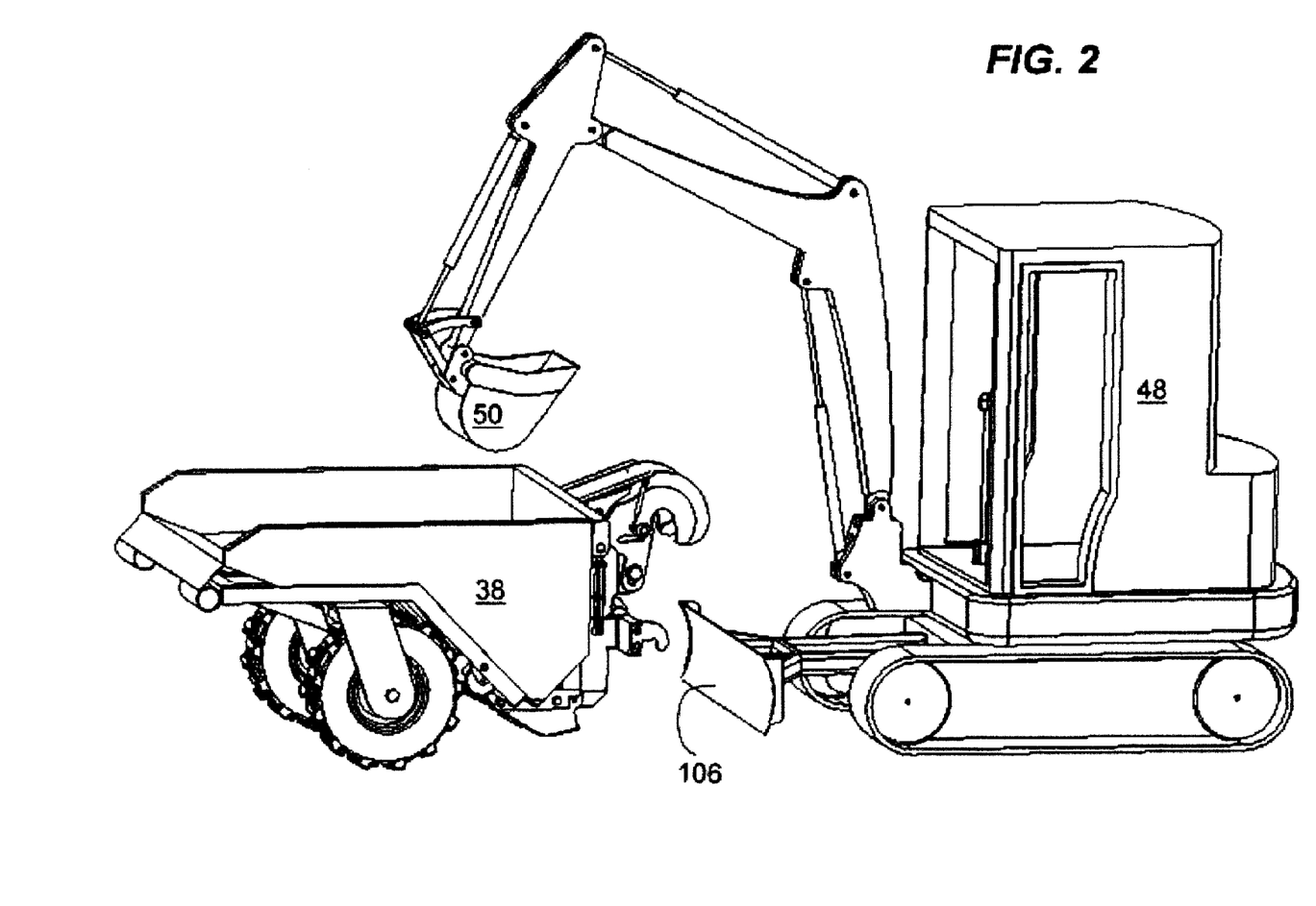
Figure 3:
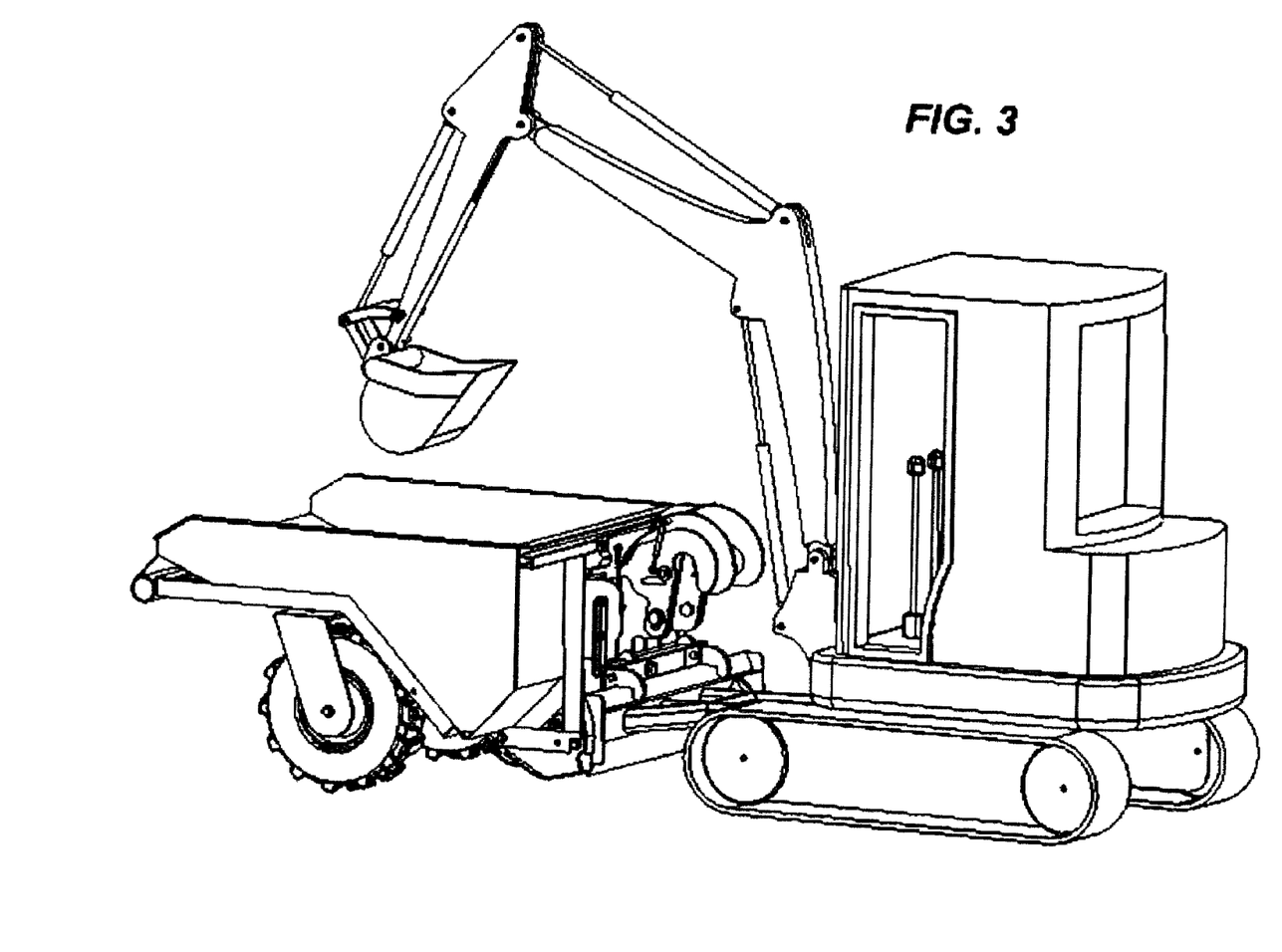
Figure 4:
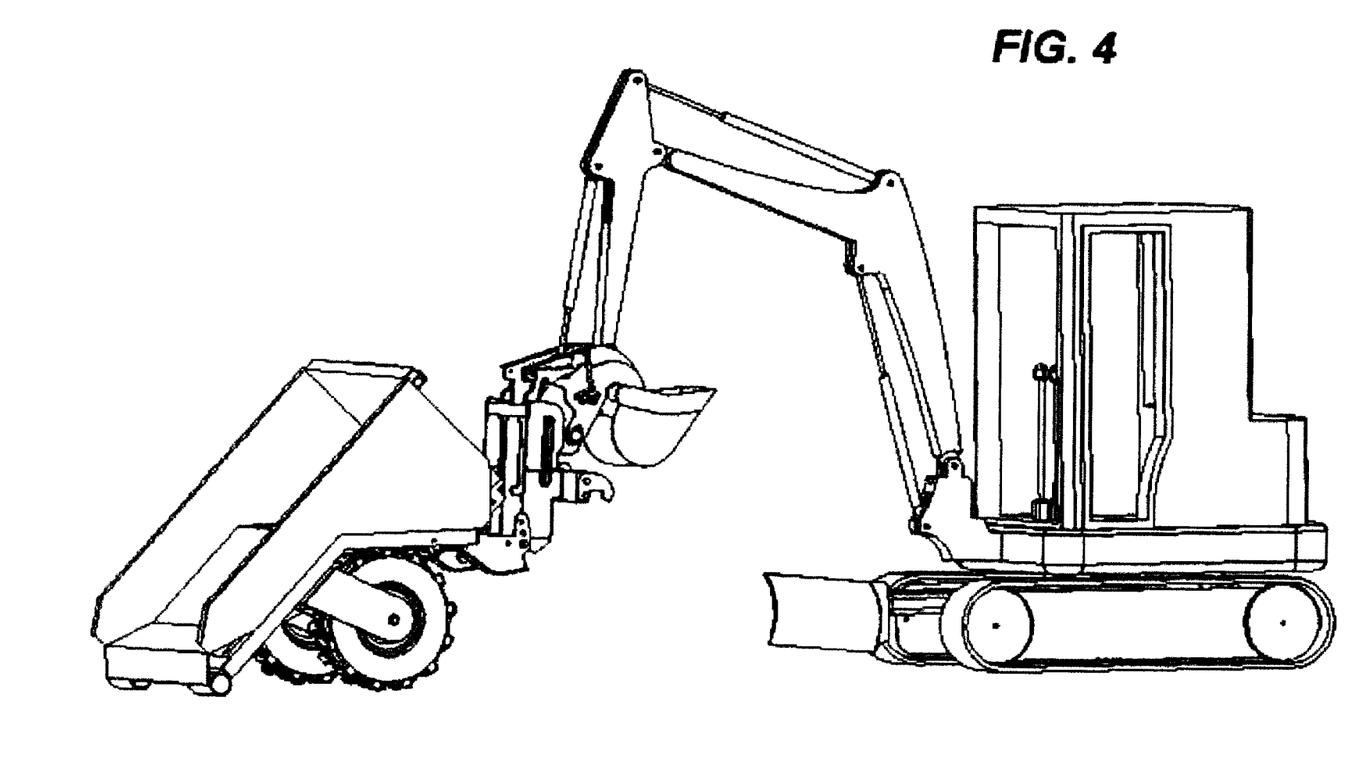
Figures 5A, 5B:
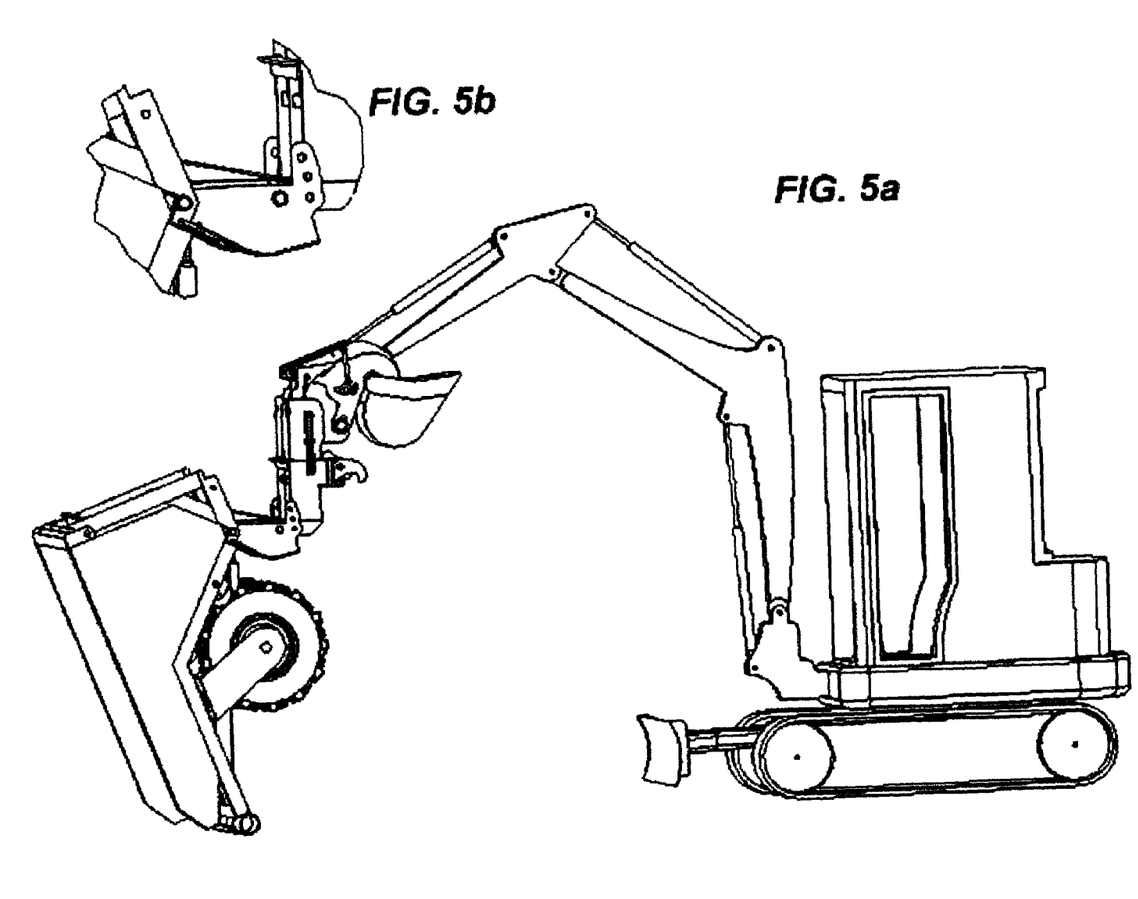
Figure 6A:
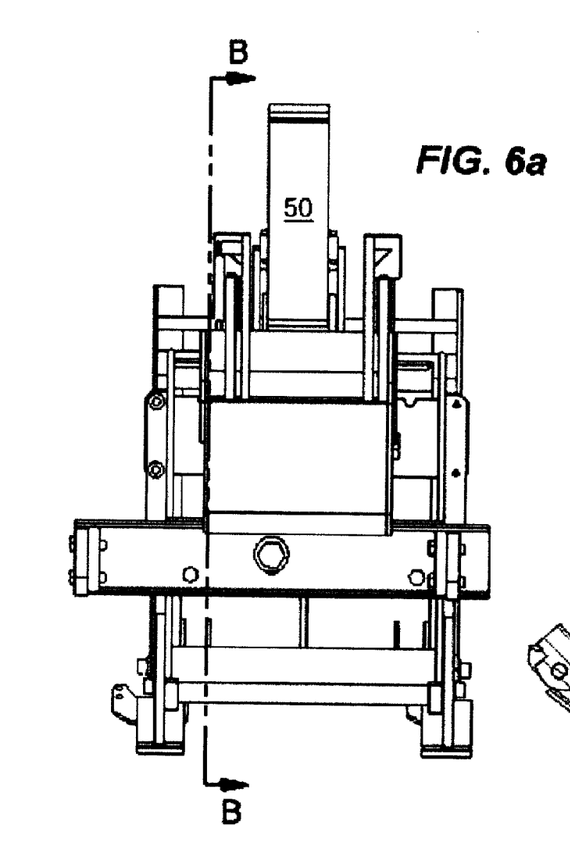
FIGS. 6*a-b* rear and side view, respectively, of the invention.
Figure 6B:
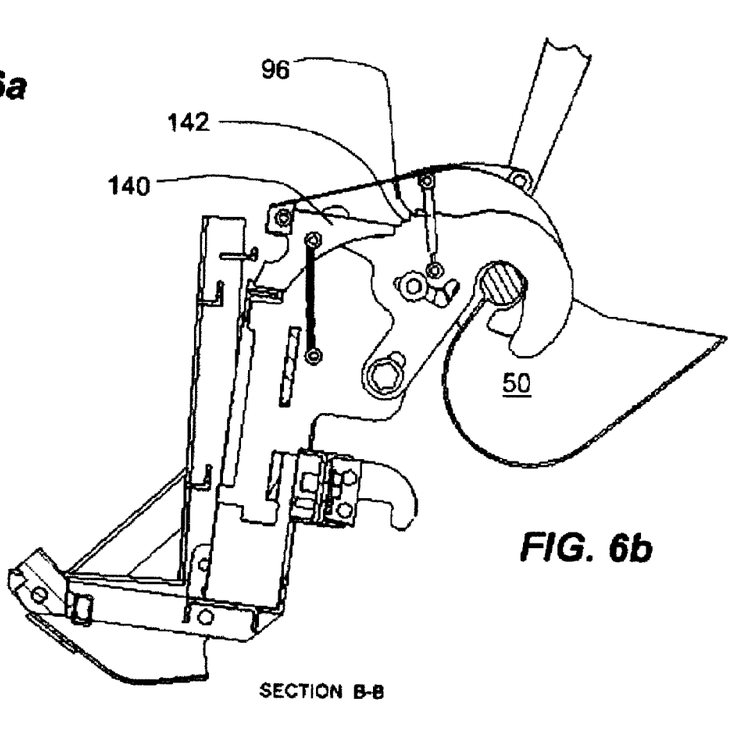
Figure 7A:
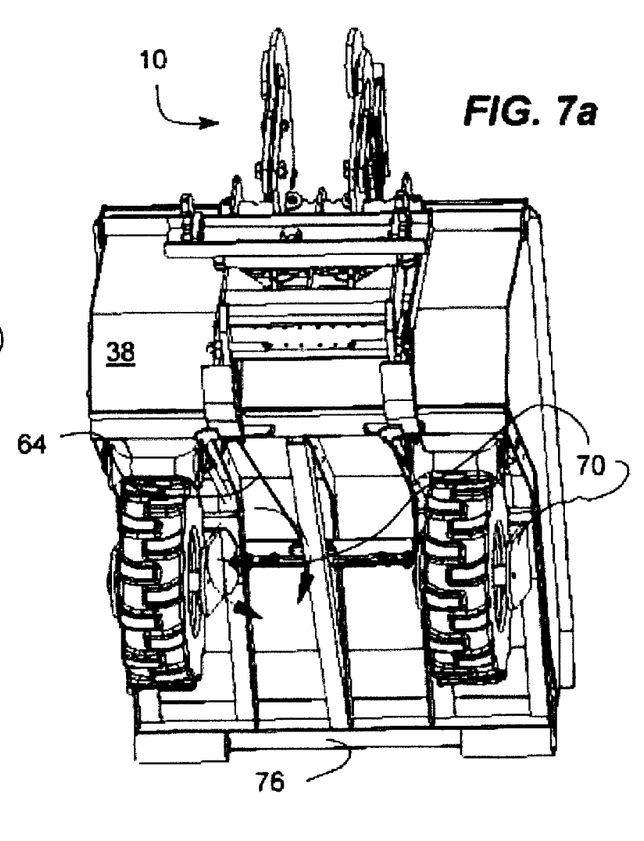
FIGS. 7*a-c* Isometric views of the invention with a bin showing the details of the notches and blockers.
Figure 7B:
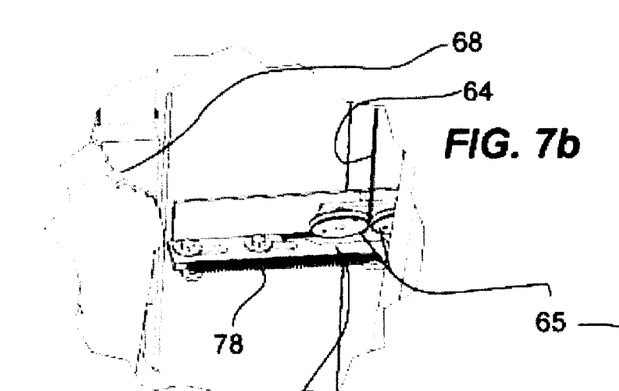
Figure 7C:
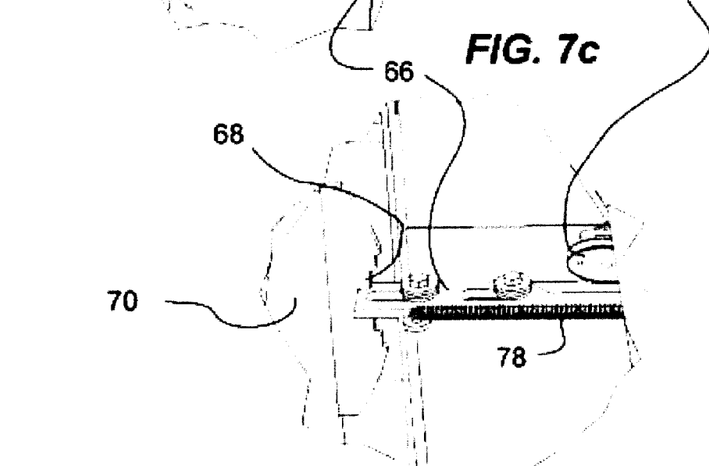
Figure 8:
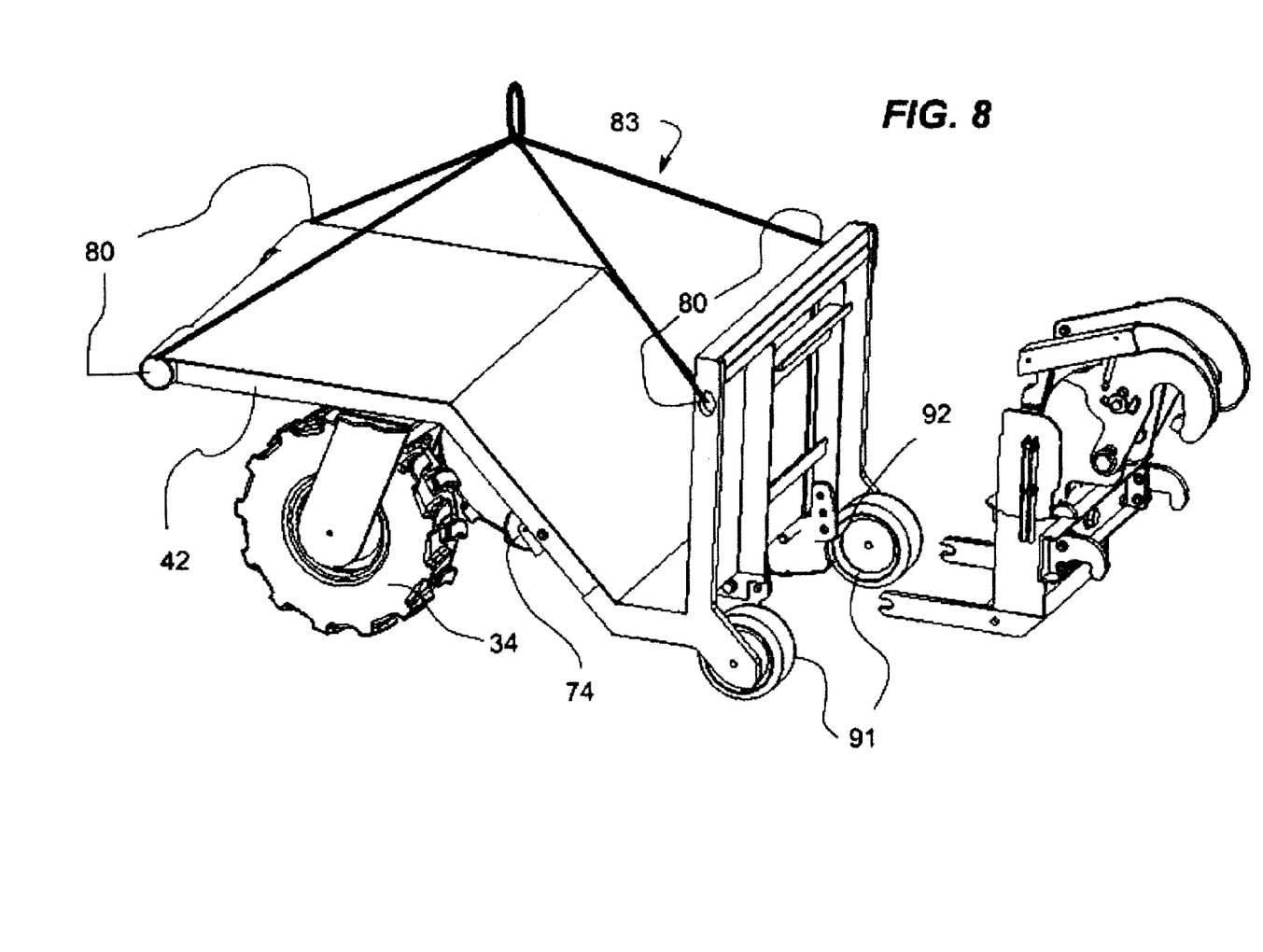
FIG. 8 Isometric view showing the frame with hoisting cables.
Figures 9A, 9B, 9C, 9D, 9E, 9F:
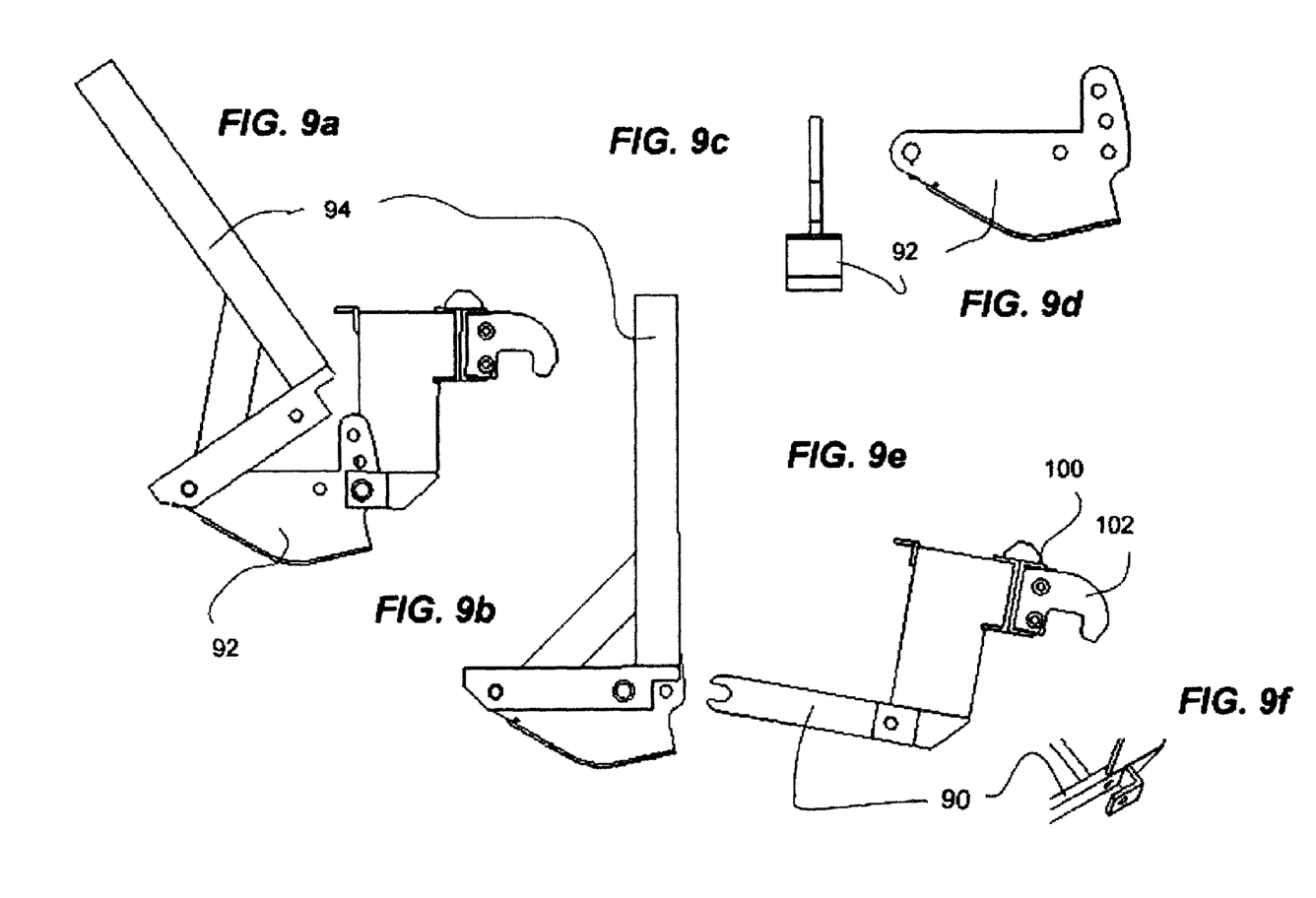
FIGS. 9*a-f* Various views of the movable members, arms, and skids.
Figures 10A, 10B, 10C, 10D, 10E, 10F:
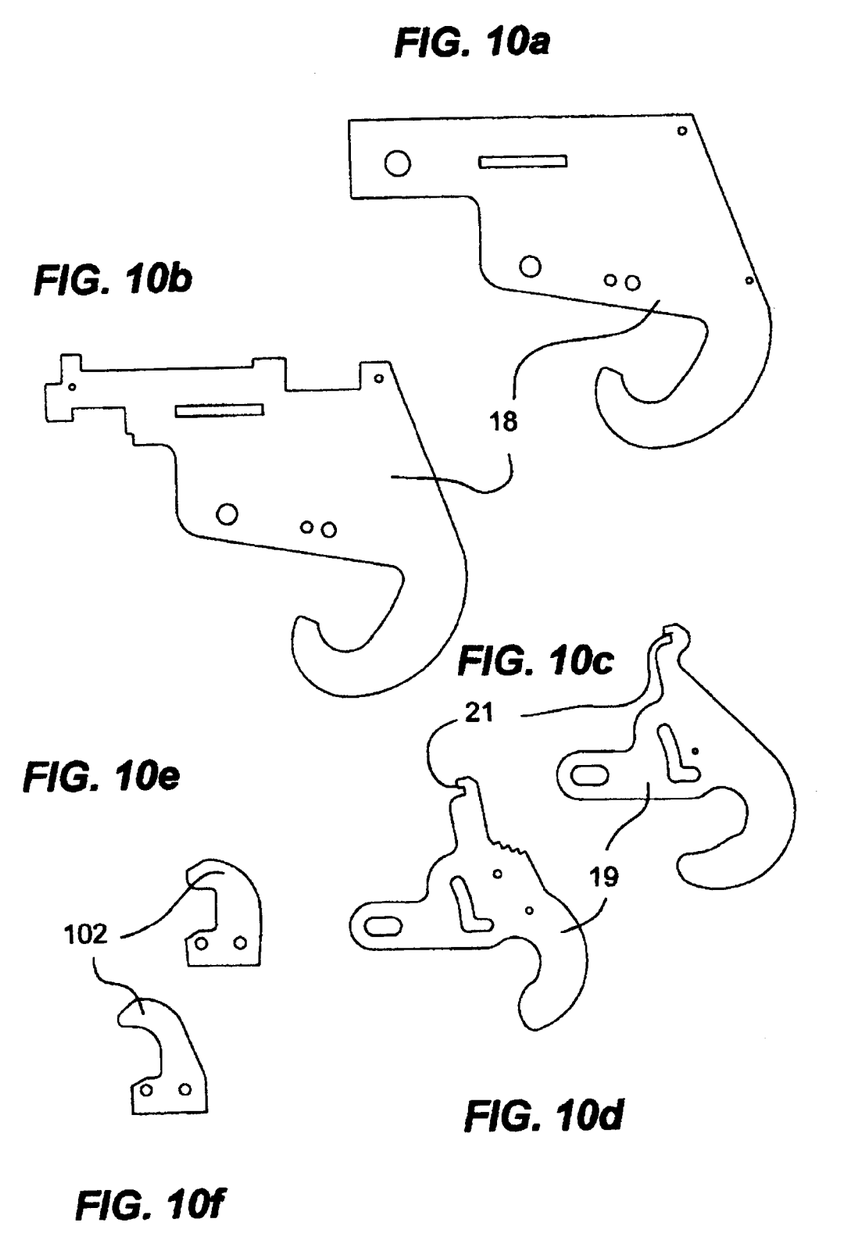
FIGS. 10*a-f* Side views of variants of the main, secondary and plow hooks.
Figures 11A, 11B, 11C:
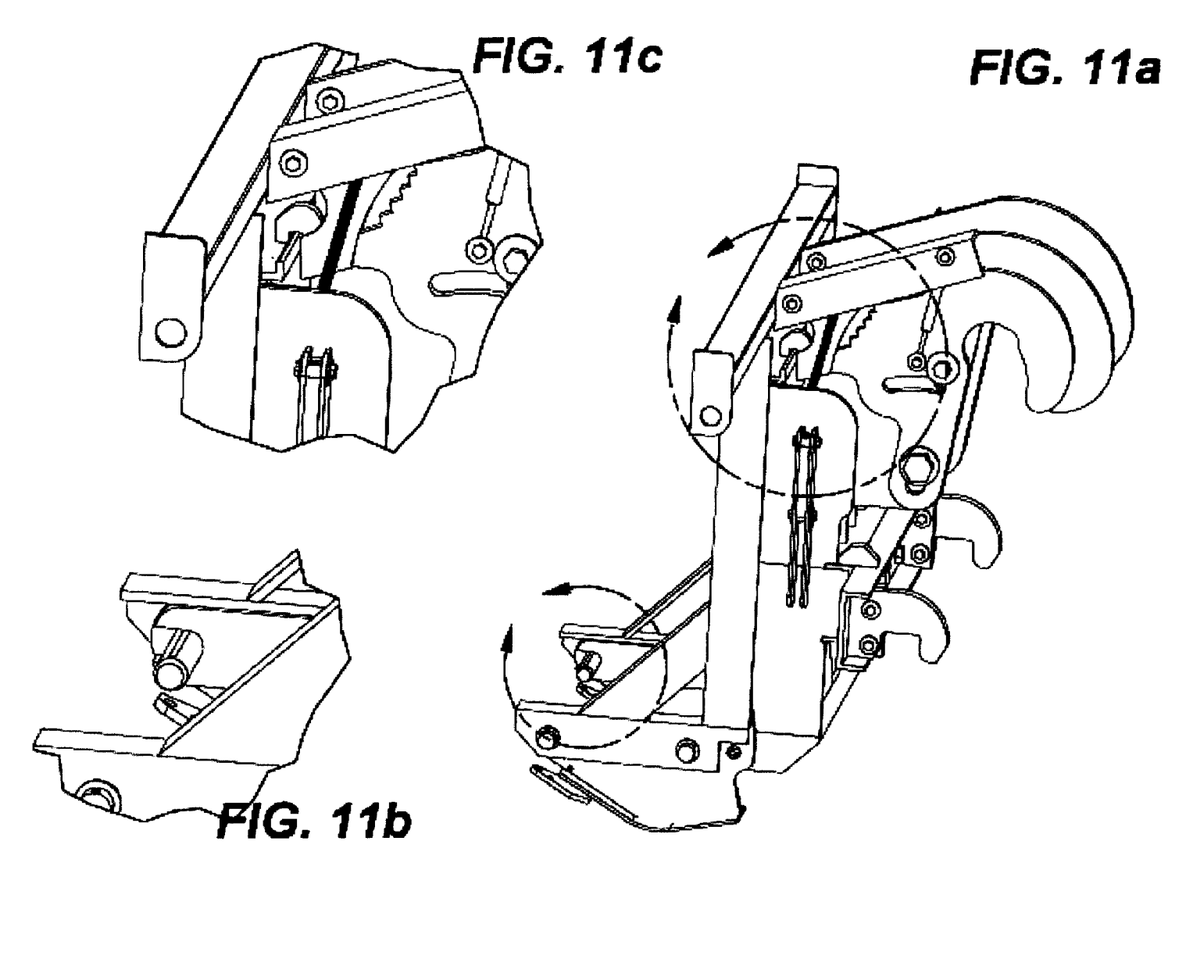
FIGS. 11*a-c* Isometric vies shoeing details of the arm connection and the small hooks connection.

Some variants include a (38) having casters (91), as seen in FIG. 8. A variant has the casters (91) being pivotable (not shown).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A load carrying bin configured to be lifted and displaced by a machinery vehicle, the machinery vehicle comprising at least one of: a machinery bucket and a machinery plow, the load carrying bin comprising:
    a load carrying main frame comprising a first frame portion for receiving the load and a second frame portion for releasably engaging with the first frame portion;
    a first engaging member substantially outwardly and downwardly extending from the load carrying main frame for releasably engaging with the machinery bucket; and
    a second engaging member substantially outwardly and downwardly extending from the load carrying main frame below the first engaging member for releasably engaging with the machinery plow;
    wherein when the machinery bucket releasably engages the first engagement member and moves in an upward direction, the first engaging member releases the releasable engagement between the second frame portion and the first frame portion, and the second frame portion of the load carrying main frame is lifted, thereby allowing the first frame portion to pivot with respect to the second frame portion; and wherein when the machinery plow releasably engages the second engagement member of the machinery vehicle and moves in one of: a backward direction and forward direction, the load carrying main frame is displaced between a first position and a second position.

2. The load carrying bin of claim 1, wherein the first engaging member comprises a first hook assembly defining a first hook engaging surface for interfacing with an upper bucket surface of the machinery bucket and further wherein the second engaging member comprises a second hook assembly defining a second hook engaging surface for interfacing with an upper plow surface of the machinery plow.

3. The load carrying bin of claim 2, wherein the first hook assembly comprises a first bucket hook and a second bucket hook distant from the first bucket hook and further wherein the second hook assembly comprises a first plow hook and a second plow hook distant from the first plow hook.

4. The load carrying bin of claim 3, wherein the first hook assembly comprises a third bucket hook rotationally engaged to the first bucket hook and a fourth bucket hook rotationally engaged to the second bucket hook.

5. The load carrying bin of claim 4, wherein the first and second engaging members are mounted on the second frame portion.

6. The load carrying bin of claim 5, wherein the second frame portion comprises a pair of elongated arms for releasably and rotatably engaging with the first frame portion, each arm of the pair of elongated arms defining a first arm end, a second arm end and comprising a mating connector at one end thereof for engaging with a corresponding mating connector on the first frame portion.

7. The attachment bracket of claim 6, wherein each arm of the pair of elongated arms defines a first pivot axis at the first end and a second pivot axis the second end, thereby allowing the first frame portion to be lifted when the machinery bucket releasably engages the first engagement member of the machinery vehicle and moves in an upward direction.

8. The load carrying bin of claim 7, wherein when the third and the fourth bucket hooks are lifted by the machinery bucket, the second frame portion disengages from the first frame portion for allowing each arm of the pair of elongated arms to rotate about the first and second pivot axis.

9. The load carrying bin of claim 1, further comprising a least one wheel for supporting the main frame, wherein the load carrying main frame further comprises a wheel support defining a wheel axis for receiving the at least one wheel, the load carrying main frame being capable of pivoting about the wheel axis.

10. An attachment bracket configured for releasably engaging with a load carrying main frame and for releasably engaging with a machinery vehicle comprising at least one of: a machinery bucket and a machinery plow, the attachment bracket comprising:

a main frame configured for engaging the load carrying main frame, the main frame comprising a first frame portion for receiving the load and a second frame portion for releasably engaging with the first frame portion;

a first engaging member substantially outwardly and downwardly extending from the main frame for releasably engaging with the machinery bucket;

a second engaging member substantially outwardly and downwardly extending from the main frame below the first engaging member for releasably engaging with the machinery plow;

wherein when the main frame engages the load carrying main frame and when the machinery bucket releasably engages the first engagement member and moves in an upward direction, the first engaging member releases the releasable engagement between the first frame portion and the second frame portion, and the second frame portion of the main frame is lifted, thereby allowing the first frame portion to pivot with respect to the second frame portion; and wherein when the machinery plow releasably engages the second engagement member of the machinery vehicle and moves in one of: a backward direction and forward direction, the main frame releasably engaged with the load carrying main frame is displaced between a first position and a second position.

11. The attachment bracket of claim 10, wherein the first engaging member comprises a first hook assembly defining a first hook engaging surface for interfacing with an upper bucket surface of the machinery bucket and further wherein the second engaging member comprises a second hook assembly defining a second hook engaging surface for interfacing with an upper plow surface of the machinery plow.

12. The attachment bracket of claim 11, wherein the first hook assembly comprises a first bucket hook and a second bucket hook distant from the first bucket hook and further wherein the second hook assembly comprises a first plow hook and a second plow hook distant from the first plow hook.

13. The load carrying bin of claim 12, wherein the first hook assembly comprises a third bucket hook rotationally engaged to the first bucket hook and a fourth bucket hook rotationally engaged to the second bucket hook.

14. The attachment bracket of claim 13, wherein the first and second engaging members are mounted on the second frame portion.

15. The attachment bracket of claim 14, wherein the second frame portion comprises a pair of elongated arms for releasably and rotatably engaging with the first frame portion, each arm of the pair of elongated arms defining a first arm end, a second arm end and comprising a mating connector at one end thereof for engaging with a corresponding mating connector on the first frame portion.

16. The attachment bracket of claim 15, wherein each arm of the pair of elongated arms defines a first pivot axis at the first end and a second pivot axis the second end, thereby allowing the load carrying main frame to be lifted when the machinery bucket releasably engages the first engagement member of the machinery vehicle and moves in an upward direction.

17. The attachment bracket of claim 16, wherein when the third and fourth bucket hooks are lifted by the machinery bucket, the second frame portion disengages from the first frame portion for allowing each arm of the pair of elongated arms to rotate about the first and second pivot axis.

18. The attachment bracket of claim 17, wherein each one of the third and fourth bucket hooks further comprises a biasing means for allowing them to return to an initial position when not forced by the machinery bucket.

19. The attachment bracket of claim 18, wherein the biasing means comprises a coil spring member.

20. The attachment bracket of claim 12, wherein the first bucket hook and the second bucket hook of the first hook assembly are adjustable to provide an adjustable bucket distance therebetween and further wherein the first plow hook and the second plow hook of the second hook assembly are adjustable to provide an adjustable plow distance, thereby respectively allowing machinery bucket and machinery plow of various size for releasably lifting and displacing the main frame.

* * * * *